(12) United States Patent
Srivastava

(10) Patent No.: US 10,838,973 B2
(45) Date of Patent: Nov. 17, 2020

(54) PROCESSING DATASETS OF VARYING SCHEMAS FROM TENANTS

(71) Applicant: The Bank of New York Mellon, New York, NY (US)

(72) Inventor: Kumar S. Srivastava, Mountain View, CA (US)

(73) Assignee: The Bank of New York Mellon, New York, NY (US)

( * ) Notice: Subject to any disclaimer, the term of this patent is extended or adjusted under 35 U.S.C. 154(b) by 153 days.

(21) Appl. No.: 15/868,832

(22) Filed: Jan. 11, 2018

(65) Prior Publication Data

US 2018/0196859 A1 Jul. 12, 2018

Related U.S. Application Data

(60) Provisional application No. 62/445,160, filed on Jan. 11, 2017.

(51) Int. Cl.
*G06F 16/25* (2019.01)
*G06F 16/21* (2019.01)
*G06F 16/23* (2019.01)

(52) U.S. Cl.
CPC .......... *G06F 16/254* (2019.01); *G06F 16/212* (2019.01); *G06F 16/2365* (2019.01); *G06F 16/258* (2019.01)

(58) Field of Classification Search
CPC ............. G06F 12/0875; G06F 12/0882; G06F 12/1408; G06F 12/1466; G06F 13/4068
See application file for complete search history.

(56) References Cited

U.S. PATENT DOCUMENTS

2006/0235714 A1* 10/2006 Adinolfi ................. G06Q 40/04
705/1.1
2009/0204626 A1* 8/2009 Mustafa ............. A61K 31/7048

* cited by examiner

*Primary Examiner* — Truong V Vo
(74) *Attorney, Agent, or Firm* — Fenwick & West LLP

(57) ABSTRACT

An online database system receives a tenant dataset from a tenant and automatically generates a mapping that can be used to convert the tenant dataset from a tenant schema to a database schema used by the online database system. To generate the mapping, the online database system analyzes individual entries of the tenant dataset received from the tenant and determines a likelihood of usage. The mapping maintains entries in the tenant dataset that are likely to be used as individual entries in the converted dataset and compresses entries that are less likely to be used into fewer entries to satisfy the database schema. The online database system converts the tenant dataset from the tenant schema to the database schema using the mapping.

17 Claims, 7 Drawing Sheets

100

US 10,838,973 B2

PROCESSING DATASETS OF VARYING SCHEMAS FROM TENANTS

CROSS REFERENCE TO RELATED APPLICATIONS

This application claims the benefit of U.S. Provisional Application No. 62/445,160, filed Jan. 11, 2017. The content of the above referenced application is incorporated by reference in its entirety.

BACKGROUND

This disclosure generally relates to computer databases, and more specifically to storing datasets from multiple tenants by an online database system.

Online database systems such as data warehouses often interact with multiple tenants. Each tenant maintains one or more datasets using a schema that is specific to the tenant. However, when a tenant dataset is stored in the online database, the tenant schema might not be supported by the database schema used by the online database. As a result, data in the tenant dataset might be lost when the tenant dataset is stored in the online database.

SUMMARY

An online database system receives a tenant dataset from a tenant and analyzes the tenant dataset to determine the custom schema utilized by the tenant, hereafter referred to as the tenant schema. The analysis includes the extraction of attributes from data values within the tenant dataset. The extracted attributes define the tenant schema. The online database system determines differences between the attributes that define the tenant schema and attributes that define the schema of datasets maintained by the online database system, hereafter referred to as the database schema. The differences between the tenant schema and the database schema are used to automatically generate a tenant-specific mapping that converts from the tenant schema to the database schema.

In various embodiments, the online database system generates the mapping by considering a likelihood of usage for entries of the tenant dataset. Entries that include data values likely to be highly utilized by the online database system are prioritized while entries that include data values that are less likely to be utilized are de-prioritized. Specifically, the mapping ensures that prioritized entries are kept as individual entries in the converted dataset whereas de-prioritized entries are compressed into fewer entries in the converted dataset. The converted dataset satisfies the database schema used by the online database system. Therefore, when the online database system accesses data values of the converted dataset, the prioritized entries in individual entries that are more likely to be used can be more easily accessed in comparison to de-prioritized entries that are compressed, but less likely to be used.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure 1:
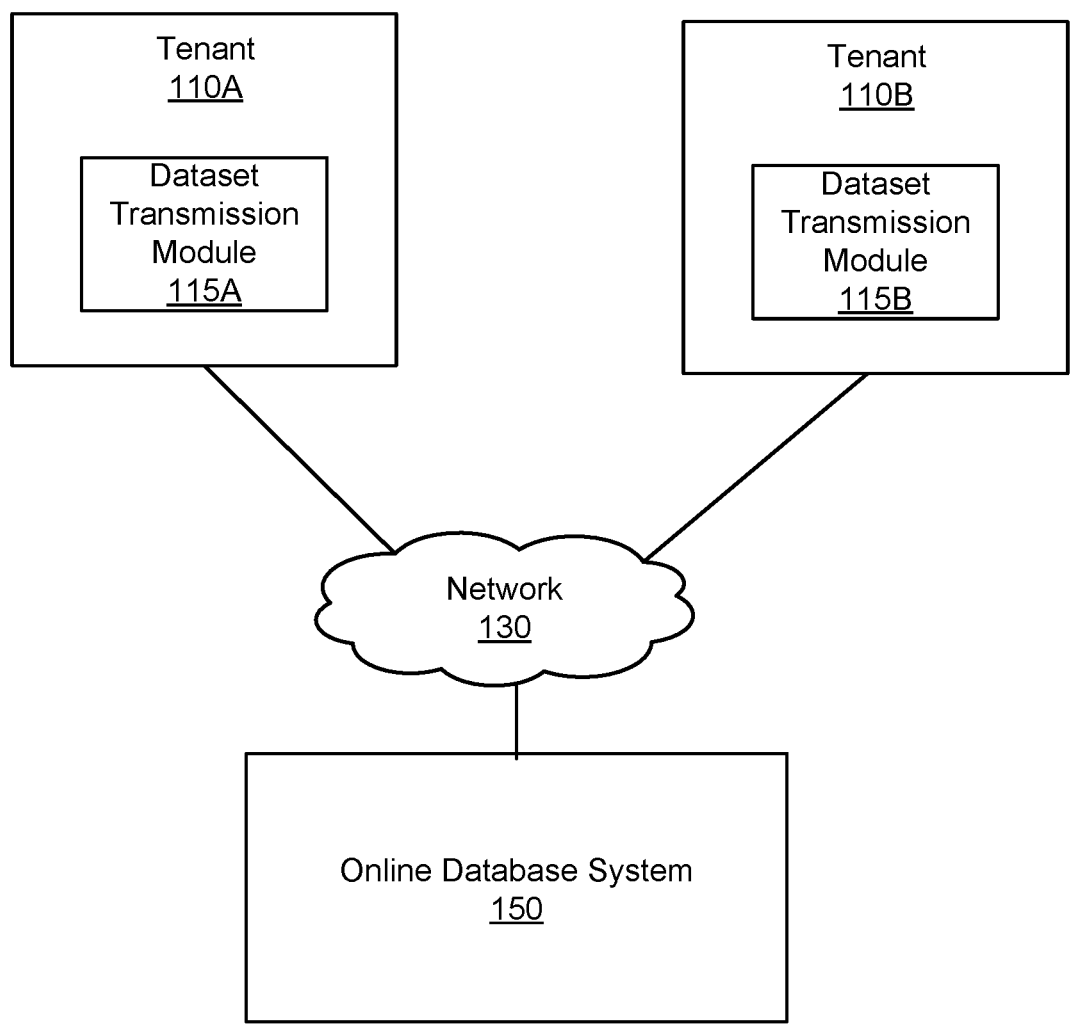
FIG. 1 depicts an overall system environment for processing tenant datasets from tenants, in accordance with an embodiment.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A" and/or "110B" in the figures).

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Overall System Environment

FIG. 1 depicts an overall system environment 100 for processing tenant datasets from tenants 110, in accordance with an embodiment. The overall system environment 100 includes an online database system 150 and two tenants 110 that are in communication with the online database system 150 through a network 130. Although FIG. 1 depicts two tenants 110A and 110B in the system environment 100, in other embodiments, there may be additional or fewer tenants 110 in the system environment 100 that each provide tenant datasets to the online database system 150.

Each of the tenants 110 and online database system 150 manages datasets according to their respective schemas. A tenant 110 maintains one or more tenant datasets having data arranged according to a tenant schema. The online database system 150 maintains multiple datasets having data arranged according to a database schema.

The network 130 facilitates communications between the one or more tenants 110 and the online database system 150. The network 130 may be any wired or wireless local area network (LAN) and/or wide area network (WAN), such as an intranet, an extranet, or the Internet. In various embodiments, the network 130 uses standard communication technologies and/or protocols. Examples of technologies used by the network 130 include Ethernet, 802.11, 3G, 4G, 802.16, or any other suitable communication technology. The network 130 may use wireless, wired, or a combination of wireless and wired communication technologies. Examples of protocols used by the network 130 include transmission control protocol/Internet protocol (TCP/IP), hypertext transport protocol (HTTP), simple mail transfer protocol (SMTP), file transfer protocol (TCP), or any other suitable communication protocol.

Each tenant 110 (e.g., 110A or 110B) stores and transmits tenant datasets that have a tenant schema used by the respective tenant 110. The tenant schema refers to the general organization of data values in the tenant dataset. Generally, each tenant 110 maintains multiple tenant datasets, each of which has a tenant schema used by the tenant 110. Therefore, if needed, each tenant 110 can readily access data values from tenant datasets maintained by the tenant 110 based on the tenant schema of the tenant datasets. As an example, if the tenant schema indicates that the first entry of a tenant dataset is a user name, the tenant 110 can search and access data values from the first entry of tenant datasets for a particular user name.

As shown in FIG. 1, each tenant 110 includes a dataset transmission module 115. The dataset transmission module 115 transmits tenant datasets maintained by the tenant 110 to the online database system 150. In various embodiments, tenant datasets can include transaction data such as private user information (e.g., name, date/place of birth, demographic information, address, and the like). Such data can also include an individual's banking information, credit card information, and social security number. Other examples of data can include non-user data such as profits, losses, changes in ownership of financial assets, and the like. In various embodiments, the tenant 110 is associated with an enterprise such as a bank or marketing agency. As an example, the tenant 110 can be an application operated by the enterprise. Therefore, an enterprise can send tenant datasets from the tenant 110 to an online database system 150 for storage purposes or for subsequent analysis of data values in the tenant datasets.

A tenant 110 is an electronic device. For example, the tenant 110 can be a personal computer (PC), a desktop computer, a laptop computer, a notebook, a tablet PC executing an operating system, for example, a Microsoft Windows-compatible operating system (OS), Apple OS X, and/or a Linux distribution. In various embodiments, a tenant 110 can be a software application executing on an electronic device that interacts with the online database system 150 by transmitting tenant datasets.

The online database system 150 is a database system that maintains database datasets using a database schema. The database schema describes the organization of data values within database datasets maintained by the online database system 150. Generally, the online database system 150 holds multiple database datasets. Each database dataset has data values organized according to the database schema. Therefore, when analyzing the database datasets, the online database system 150 can use the database schema to access particular data values in the database datasets.

The online database system 150 receives tenant datasets from multiple tenants 110. The online database system 150 determines how to best process each tenant dataset that has a tenant schema that differs from the database schema of database datasets maintained by the online database system 150. The online database system 150 automatically generates a mapping that can be used to convert tenant datasets received from the tenant 110 to satisfy the database schema used by the online database system 150. In various embodiments, the mapping is a tenant-specific mapping that enables the online database system 150 to convert each tenant dataset from the tenant 110 without losing information that is included in the tenant dataset. Altogether, for each tenant 110 in the system environment 100, the online database system 150 can process tenant datasets received from the tenant 110 using the automatically generated tenant-specific mapping. Each processed tenant dataset, hereafter referred to as a converted dataset, satisfies the database schema used by the online database system 150.

The online database system 150 can be one or more electronic devices. In some embodiments, the online database system 150 can be embodied as a cloud server or rack server. In other words, the functions and algorithms performed by the online database system 150 can be distributed across multiple processors and/or electronic devices. In some embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Figure 2:
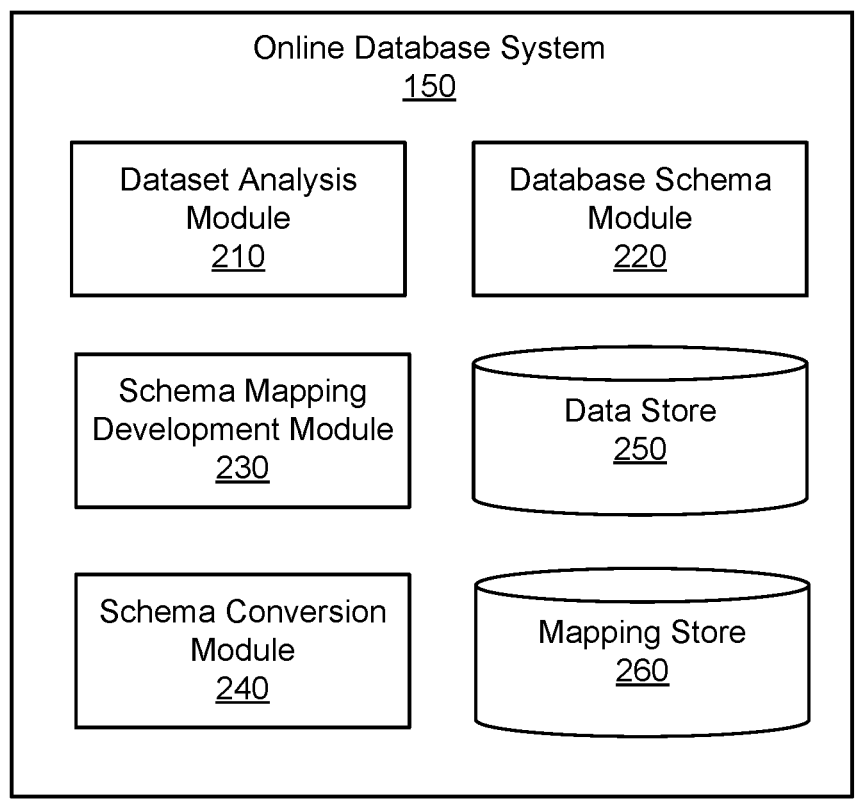
FIG. 2 depicts a block diagram architecture of the online database system, in accordance with an embodiment.

FIG. 2 depicts a block diagram architecture of the online database system 150, in accordance with an embodiment. The online database system 150 includes a dataset analysis module 210, a database schema module 220, a schema mapping development module 230, and a schema conversion module 240. Together, these modules enable the online database system 150 to appropriately process and convert tenant datasets received from tenants 110 such that the converted datasets maintain information originally in the tenant datasets while also satisfying the database schema of database datasets maintained by the online database system 150.

The dataset analysis module 210 receives a tenant dataset from a tenant 110 and analyzes the tenant dataset to determine the tenant schema of the tenant dataset. The tenant schema of the tenant dataset describes the organizational structure of the data values in the tenant dataset. As an example, a tenant schema of a tenant dataset can indicate that a first data value is located at a first position in the dataset, a second data value is located at a second position in the dataset, and so on. The dataset analysis module 210 provides the determined tenant schema of the tenant dataset to the schema mapping development module 230.

The dataset analysis module 210 determines the tenant schema of the tenant dataset by extracting attributes of the data values in the tenant dataset. In one embodiment, to extract attributes for a data value, the dataset analysis module 210 performs a pattern recognition on the data value. By performing a pattern recognition of the data value, the dataset analysis module 210 determines a regular expression of the data value. A regular expression can be any pattern in the data value such as a space between two strings (e.g., for a name) or 15 to 16 numerical digits (e.g., for a credit card number). Other examples of regular expression of a data value include a number of digits in the data value, an estimated range of values for the data value, a format of the data value, a symbol in the data value, a location of a symbol in the data value, a sequence of characters in the data value and the like. The regular expression determined from a data value can serve as an extracted attribute of a data value.

In various embodiments, the dataset analysis module 210 can identify a type corresponding to the data value, hereafter referred to as a data value type. The data value type is a descriptive category of a data value. Examples of data value types include a user name, date/place of birth, demographic information, address, user identifier, credit card number, social security number, and banking information. To determine a data value type of a data value, the dataset analysis module 210 analyzes the extracted attributes of the data value. In one embodiment, the dataset analysis module 210 performs a hierarchical analysis on the extracted attributes of the data value to identify the data value type. For example, numerous data value types may be expressed as a string (e.g., user name, individual's name, address, credit card number); however, far fewer data value types are expressed as a string and have a regular expression of 15 to 16 numerical digits in the string (e.g., credit card number). The hierarchy of attributes (e.g., rank 1=string/integer/Boolean, rank 2=15-16 numerical digits) is managed and stored by the dataset analysis module 210. Therefore, for a data value, the dataset analysis module 210 first identifies possible data value types based on a first attribute (e.g., rank 1 attributes such as string, Boolean, or integer). Then from amongst these possible data value types, the dataset analysis module 210 further eliminates data value types that do not correspond to the subsequent attributes of the data value (e.g., rank 2 attributes such as a regular expression of 15 to 16 numerical digits). Therefore, the dataset analysis module 210 narrows the possible data value types through this hierarchical process and in some embodiments, can identify the likely data value type without having to analyze all extracted attributes for a data value.

In some embodiments, to determine whether a data value type corresponds to an extracted attribute, the dataset analysis module 210 accesses stored relationships between extracted attributes and types of data values. For example, a string can have a stored relationship with various data value types such as a user name, user identifier, address, and credit card number whereas an identification of 15 to 16 numerical digits with an object type of integer has a stored relationship with only a credit card number type. Stored relationships can be provided by an administrator of the online database system 150 or can be determined by analyzing data values that have been previously labeled as a particular data value type.

The dataset analysis module 210 determines the tenant schema of the tenant dataset. In one embodiment, the tenant schema can be expressed as the ordered combination of the attributes extracted from data values in the tenant dataset. An example of such a tenant schema can be expressed as Schema:
<[string, two words separated by a space, each word in the string is capitalized], [string, one letter followed by three numbers, "_" character in the 2nd position],
[integer, 16 digits],
[string, "-" character in the 4th and 7th positions of the string]>.

Here, the first entry of the tenant dataset may be a user name (e.g., "John Smith") and therefore, the extracted attributes include a string type attribute, a regular expression of two words separated by a space character, and a regular expression describing that each word in the string is capitalized. The second entry of the tenant dataset is the user identifier, an example of which can be "B_579." Here, the extracted attributes of the user identifier include a string type attribute, a regular expression of one letter (e.g., "B") followed by three numbers ("579"), and a regular expression of an underscore (e.g., "_") character in the second position. The third entry of the tenant dataset is the credit card number. Here, the extracted attributes of the credit card number include an integer type attribute and a regular expression of a total of 16 digits. The fourth entry of the tenant dataset is a social security number. Here, the extracted attributes of the social security number includes a string type attribute and a regular expression of a dash (e.g., "-") character in the $4^{th}$ and $7^{th}$ positions in the string.

In various embodiments, the dataset analysis module 210 determines the tenant schema of the tenant dataset based on the data value types of data values in the dataset. Here, the dataset analysis module 210 determines the tenant schema of the tenant dataset according to the ordered combination of the data value types. Continuing with the previous example, the dataset analysis module 210 may determine that the set of attributes including [string, two words separated by a space, each word in the string is capitalized] corresponds to a user name data value type. Additionally, the dataset analysis module 210 may determine that the set of attributes including [string, one letter followed by three numbers, "_" character in the 2nd position] corresponds to a user identifier data value type. Similarly, the dataset analysis module 210 can determine data value types for each of the additional sets of attributes. Once the dataset analysis module 210 has determined the data value types of the tenant dataset, the dataset analysis module 210 can express the tenant schema of the tenant dataset as:

Schema: <User Name, User ID, Credit Card Number, Social Security Number> where the name data value type is the first entry in the tenant dataset, the user ID data value type is the second entry in the tenant dataset, the credit card number data value type is the third entry in the tenant dataset, and the social security number data value type is the fourth entry in the tenant dataset.

The database schema module 220 determines the database schema that represents the organization of database datasets maintained by the online database system 150. In one embodiment, the database schema is specified by an administrator of the online database system 150. Therefore, the database schema module 220 receives the database schema specified by the administrator. In some embodiments, the database schema module 220 analyzes database datasets stored in data store 250 of the online database system 150 to determine the database schema. Thus, the database schema module 220 can continuously monitor the database datasets to ensure that the database schema does not unexpectedly change. The database schema module 220 provides the database schema to the schema mapping development module 230.

The schema mapping development module 230 compares the tenant schema of the tenant dataset with the database schema of the database datasets maintained by the online database system 150. The schema mapping development module 230 determines a mapping that can be used to convert the tenant schema of the tenant dataset to satisfy the database schema of the database datasets maintained by the online database system 150. In various embodiments, the mapping is automatically generated by the schema mapping development module 230 when provided the tenant schema and the database schema.

The schema mapping development module 230 determines how to best modify the tenant dataset to satisfy the database schema while maintaining the information included in the tenant dataset. The schema mapping development module 230 compares the tenant schema to the database schema and determines differences between the tenant schema and the database schema. Examples of differences between the tenant schema and database schema can include differences between a total number of entries in the schema, differences between the attributes in entries of the schema, or differences between the data value type in entries of the schema.

The schema mapping development module 230 may perform comparisons at the schema level, at the entry level, and/or at the attribute level. At the schema level, the schema mapping developing module 230 directly compares the tenant schema to the database schema to determine whether the schemas match. If the tenant schema and the database schema match, then the schema mapping development module 230 need not perform comparisons at the entry level and the attribute level as by default, the entries and the attributes of the tenant schema and the database schema would also match.

If schema level comparison yields a non-match between the tenant schema and the database schema, the schema mapping development module 230 performs a comparison at the entry level. For example, the schema mapping development module 230 can compare the number of entries in the tenant schema to the database schema, the data value type of each entry in the tenant schema to the data value type of each entry in the database schema, and the organizational structure of entries (e.g., entries in a row, entries in a column, scattered entries) in the tenant schema and entries in the database schema. In various embodiments, the schema mapping development module 230 may determine that a subset of entries in the tenant schema are different from a subset of entries in the database schema. The schema mapping development module 230 may perform a comparison at the attribute level across the subset of entries of the tenant schema and the database schema that differ.

The schema mapping development module 230 performs a comparison at the attribute level to determine differences between attributes of data values in each of the tenant schema and the database schema. As an example, the schema mapping development module 230 determines whether each attribute of a data value in an entry of the tenant schema differs from attributes of data values in entries of the database schema.

Based on the differences between the tenant schema and the database schema, the schema mapping development module 230 determines how to convert the tenant dataset to satisfy the database schema. In various embodiments, the schema mapping development module 230 may identify that data value types of the tenant schema of the tenant dataset can be directly mapped to the database schema. In such embodiments, each data value type of the tenant schema of the tenant dataset is also included in the database schema. To provide an example, the tenant schema can include a first entry that includes a user name data value type and a second entry that includes a user identifier data value type. The database schema may also include a user name data value type and a user identifier data value type. Given that each of the data value types included in the tenant schema are also included in the database schema, the schema mapping development module 230 may generate a mapping that directly maps the user data value type and user identifier data value type of the tenant schema to the user data value type and user identifier data value type, respectively, of the database schema.

In various embodiments, the schema mapping development module 230 determines, based on the differences between the tenant schema and the database schema, that one or more entries of the tenant dataset is to be compressed in order to satisfy the database schema. For example, if the differences between the tenant schema and the database schema indicate that the tenant schema includes more entries than the database schema, the schema mapping development module 230 analyzes the entries of the tenant dataset to determine which entries to compress.

In one embodiment, the schema mapping development module 230 analyzes each of the data value types in entries of the tenant dataset to determine which of the entries to compress. In another embodiment, the schema mapping development module 230 analyzes the individual data values within the entries of the tenant dataset to determine which of the entries to compress. By analyzing each data value type or each data value in entries of the tenant dataset, the schema mapping development module 230 assigns a predicted usage score to each entry of the tenant dataset. The predicted usage score represents a likelihood that the data value in the entry will be used by the online database system 150.

In one embodiment, to determine the predicted usage score for each entry in the tenant schema of the tenant dataset, the schema mapping development module 230 analyzes prior usage patterns of a data value or a data value type included in database datasets stored in the data store 250 of the online database system 150. Examples of usage patterns include the retrieval of data values or data value types in response to particular actions (e.g., search queries that specify a data value or data value type), an access frequency of a data value or data value type, or an update frequency of a data value or data value type. Generally, if the usage pattern indicates a high rate of usage for a data value or a data value type, the schema mapping development module 230 can assign a high score to the entry of the tenant dataset that holds the data value or the data value type. The high score enables the entry to be kept as an individual entry when the tenant dataset is converted to the database schema.

In some embodiments, to determine a predicted usage score for an entry in the tenant schema of the tenant dataset, the schema mapping development module 230 analyzes the frequency of occurrence of the data value in the entry of the tenant dataset. The frequency of occurrence of particular data values in the tenant dataset can be an indication as to how likely the data value will be subsequently used by the online database system 150. For example, given that a data value of an entry occurs very frequently or very infrequently in the tenant dataset, it may be unlikely that the online database system 150 uses the data value for the purposes of filtering searches or for the purposes of accessing particular database datasets. In one embodiment, a data value that either appears very frequently or appears very infrequently is assigned a lower score as the data value is less likely to be used by the online database system 150. Example data values that appear very frequently can be a designation of a specific country or state. Examples of data values that appear very infrequently can be a specific social security number or a specific credit card number. Conversely, when a data value in an entry occurs with a middling frequency throughout the tenant dataset, the entry can be assigned a higher score in comparison to an entry that includes a data value that occurs extremely frequently or extremely infrequently.

In one embodiment, the schema mapping development module 230 may designate one or more threshold values for the purposes of categorizing the frequency of occurrence of a data value into one of various categories. As a specific example, categories describing the frequency of occurrence of data values can include the categories of: extremely infrequent, infrequent, middling frequency, frequency, and extremely frequent. The designated threshold values can delineate the categories from one another.

In various embodiments, the schema mapping development module 230 determines a predicted usage score for each entry in the tenant schema of the tenant dataset based on a combination of the analysis of the prior usage patterns of database datasets and the analysis of the frequency of occurrence of data values in the tenant dataset. For example, the predicted usage score can be a weighted combination of the prior usage pattern analysis of a data value type of the entry and the frequency of occurrence of a data value in the entry in the tenant dataset. In one embodiment, the schema mapping development module 230 more heavily weighs the contribution from the analysis of the prior usage patterns in comparison to the contribution from the analysis of the frequency of occurrence of the data value. This may be beneficial as the prior usage patterns of a data value type are a more direct reflection of the predicted usage of a type of data value whereas the frequency of occurrence of data values are an indirect reflection of the predicted usage of types of data values.

The schema mapping development module 230 generates the mapping using the predicted usage score assigned to each entry of the tenant dataset. The schema mapping development module 230 generates a mapping that maps a threshold number of entries of the tenant dataset that are assigned the highest predicted usage scores while compressing the other entries that are assigned lower predicted usage scores. The mapping ensures that the threshold number of entries of the tenant dataset assigned the highest predicted usage scores are kept as individual entries when the tenant dataset is converted.

In one embodiment, the threshold number of entries mapped by the mapping is dependent on the total number of entries of the database schema. In one embodiment, if the database schema 230 includes N total entries, the schema mapping development module 230 generates a mapping that directly maps the M highest scoring entries of the tenant dataset to M of the N total entries of the tenant dataset. Here, M represents the threshold number of entries. Therefore, the remaining entries of the tenant dataset that are not in the M highest scorers are compressed and placed in the remaining number of (NM) entries to satisfy the total number of entries in the database schema 230. In some embodiments, the mapping maps the data values in the highest scoring N−1 entries of the tenant dataset while compressing the data values in the remaining entries of the tenant dataset to be placed in a single entry to satisfy the database schema 230. Here, N−1 represents the threshold number of entries.

In various embodiments, the mapping can further specify a conversion of one or more data values in entries of the tenant dataset that enables the converted dataset to satisfy the database schema. An example of a conversion can be an object type conversion (e.g., string to integer, integer to string, and the like). As an example, an entry in the tenant dataset can include a credit card data value type, which can be an integer data value type. If the entry including the credit card data value type is to be compressed with other data values that are a string data value type, the mapping can specify a conversion of the integer data value type of the credit card number to a string data value type that enables the string concatenation of the credit card number with the other data values into a single entry.

In various embodiments, the mapping may specify the addition of symbols in entries of the converted dataset. The added symbols indicate the different data values that were compressed into a single entry. Examples of symbols can be an underscore "_" or ampersand "&." The inclusion of a symbol can be useful for delineating data values that are compiled in the single entry if a particular data value in the single entry is subsequently needed by the online database system 150.

In various embodiments, the mapping maps data values in one or more entries of the tenant dataset to one or more entries of a secondary dataset, the secondary dataset representing a dataset separate from the converted dataset. The secondary dataset can be stored separately from the converted dataset. In various embodiments, the secondary dataset includes a tag that identifies the converted dataset. Therefore, when a converted dataset is accessed, the secondary dataset can similarly be accessed via the tag of the secondary dataset. To generate a mapping that maps data values in entries of the tenant dataset to entries of a secondary dataset, the schema mapping development module 230 can use the predicted usage score assigned to each entry of the tenant dataset. In one embodiment, the one or more entries of the tenant dataset that are mapped to entries of the secondary dataset are each assigned a predicted usage score that is below a threshold usage score. Further description in relation to the secondary dataset is described below in reference to FIG. 5B.

The schema mapping development module 230 generates mappings that are tenant-specific and therefore, can be used to convert subsequently received tenant datasets from the tenant 110. Each of the generated mappings is stored in the mapping store 260 for subsequent retrieval and usage. In various embodiments, each mapping is stored with metadata that indicates the tenant 110 that the mapping is generated for.

Figure 3A:
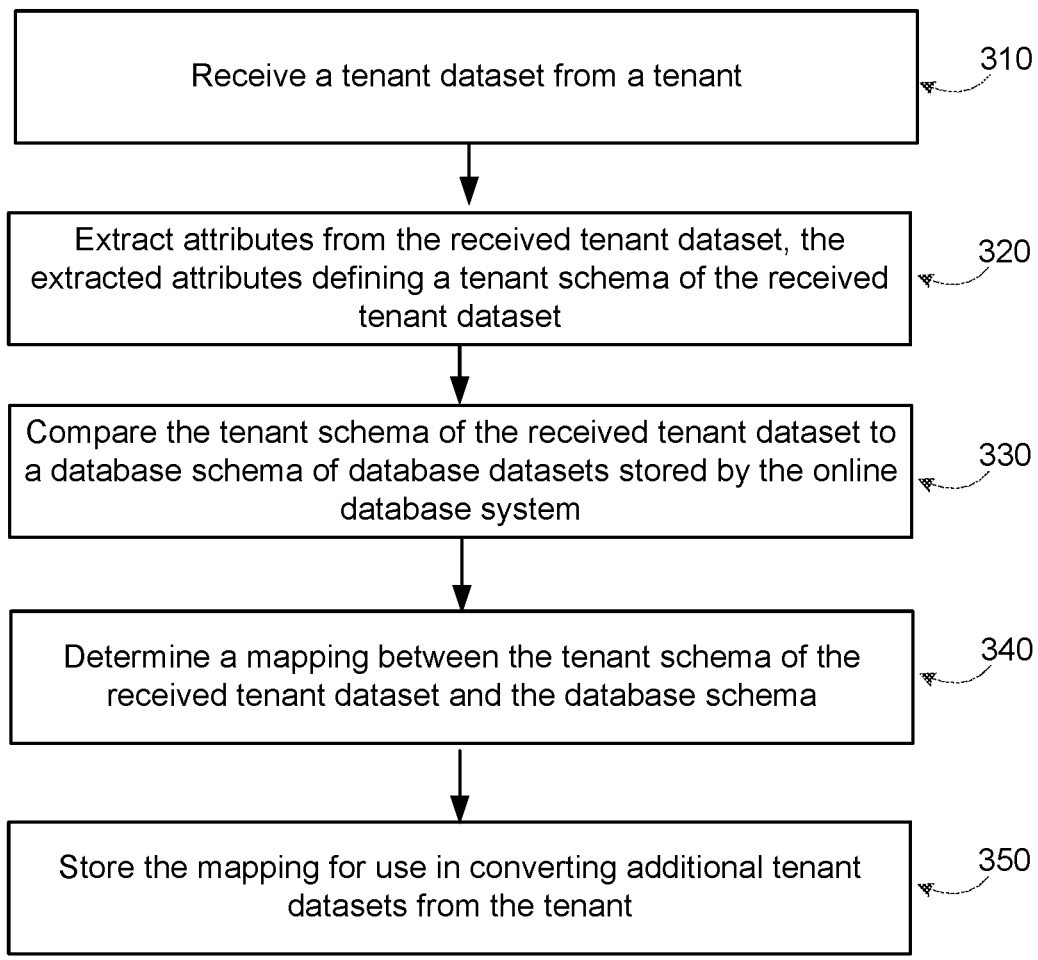
FIG. 3A is a flow process for determining a tenant-specific mapping that can be used to convert tenant datasets to satisfy a database schema used by the online database system, in accordance with an embodiment.

Reference is now made to FIG. 3A, which depicts a flow process 300 for generating a tenant-specific mapping that can be used to convert tenant datasets to satisfy a database schema used by the online database system 150, in accordance with an embodiment. The online database system 150 receives 310 a tenant dataset from a tenant. The online database system 150 extracts 320 attributes from the received tenant dataset. In various embodiments, the extracted attributes define the tenant schema of the received tenant dataset. The online database system 150 compares 330 the tenant schema of the received tenant dataset to a database schema of database datasets stored by the online database system. Based on the comparison, the online database system 150 determines 340 a mapping between the tenant schema of the received tenant dataset and the database schema. The online database system 150 stores 350 the mapping for use in converting additional tenant datasets from the tenant.

Returning to FIG. 2, the schema conversion module 240 uses a tenant-specific mapping to convert tenant datasets. By using the mapping, schema conversion module 240 generates converted datasets that satisfy the database schema of database datasets stored by the online database system 150.

More specifically, the schema conversion module 240 receives tenant datasets from a tenant 110. Here, the schema conversion module 240 may receive tenant datasets that hold different data values in comparison to the tenant dataset received by the dataset analysis module 210. The schema conversion module 240 retrieves the mapping generated for the tenant 110 from the mapping store 260. In various embodiments, the schema conversion module 240 locates a mapping by identifying the tenant 110 described in metadata associated with the mapping.

The schema conversion module 240 may perform a check on the tenant datasets received from the tenant 110 to ensure that tenant datasets can be appropriately converted using the mapping. The schema conversion module 240 determines whether the tenant schema of a received tenant dataset aligns with the tenant schema of the tenant dataset that was received by the dataset analysis module 210 and previously used to generate the mapping.

The schema conversion module 240 can determine the tenant schema of the tenant dataset using a method similar to the above description in relation to the dataset analysis module 210. The schema conversion module 240 determines the tenant schema of a tenant dataset by extracting attributes from data values in entries of the tenant dataset. Thus, the tenant schema can be defined by the extracted attributes of entries in the tenant dataset. The schema conversion module 240 compares the tenant schema of tenant dataset to the tenant schema previously determined by the dataset analysis module 210 and previously used by the schema mapping development module 230 to generate the mapping. In one embodiment, aligned schemas refer to schemas that are matching. In another embodiment, aligned schemas refer to schemas that have a threshold number of common attributes that define each schema.

If the comparison yields that the tenant schema determined by the schema conversion module 240 does not align with the tenant schema determined by the dataset analysis module 210, the schema conversion module 240 can trigger a re-mapping process to generate a new mapping for the tenant 110. For example, the re-mapping process can involve the steps described in FIG. 2B to determine a new tenant-specific mapping that enables the conversion of tenant datasets from the tenant 110 to satisfy the database schema.

Here, if the comparison yields that the tenant schemas are aligned, the schema conversion module 240 proceeds with converting the tenant datasets received by the schema conversion module 240 by using the mapping. The schema conversion module 240 can map one or more entries of a tenant dataset to entries of a converted dataset as specified by the mapping. In various embodiments, schema conversion module 240 compresses multiple entries of the tenant dataset into fewer entries of the converted dataset as specified by the mapping. In such embodiments, the schema conversion module 240 can perform additional processes such as a compression process (e.g., string concatenation), a conversion process (e.g., convert string to integer, integer to string, and the like), a data value modification process (e.g., adding symbols to delineate data values from different entries that are now compressed). The schema conversion module 240 stores the converted datasets in the data store 250.

Figure 3B:
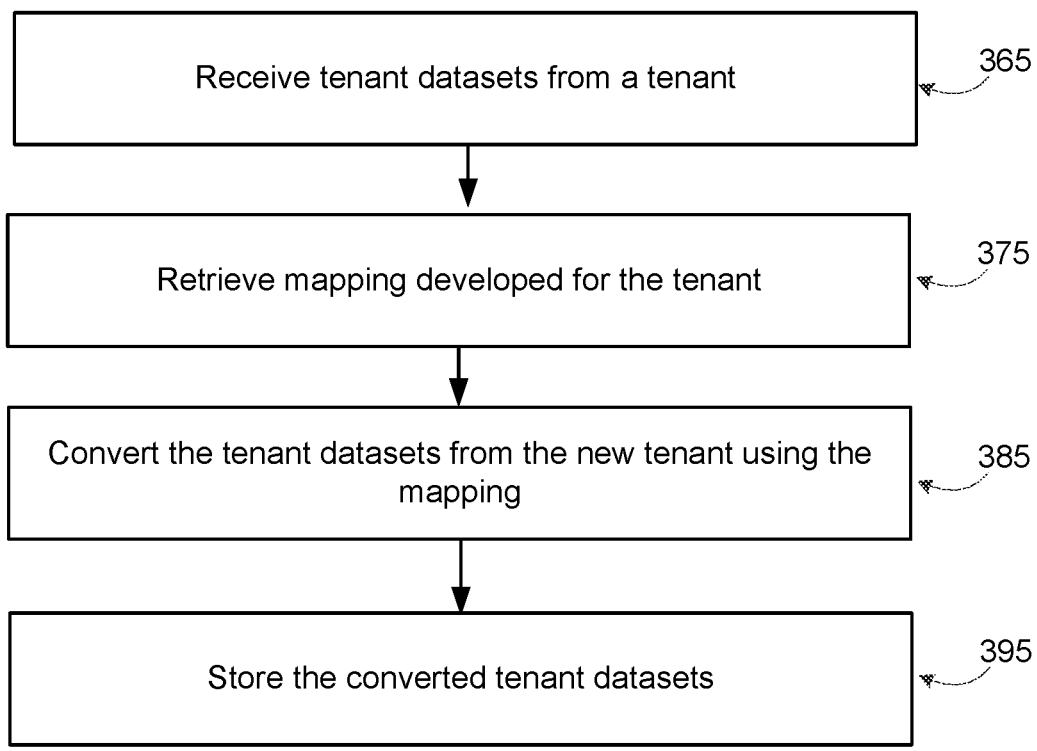
FIG. 3B is a flow process for converting tenant datasets using a mapping to generate converted datasets that satisfy the database schema, in accordance with an embodiment.

Reference is now made to FIG. 3B, which is a flow process 360 for converting tenant datasets using a mapping to generate converted datasets that satisfy the database schema, in accordance with an embodiment. The online database system 150 receives 365 tenant datasets from a tenant 110. The online database system 150 retrieves 375 a tenant-specific mapping that was previously developed for the tenant 110. The online database system 150 converts 385 the received tenant datasets using the retrieved mapping and stores 395 the converted datasets in the data store 250.

Example Tenant Dataset and Database Dataset

Figure 4A:
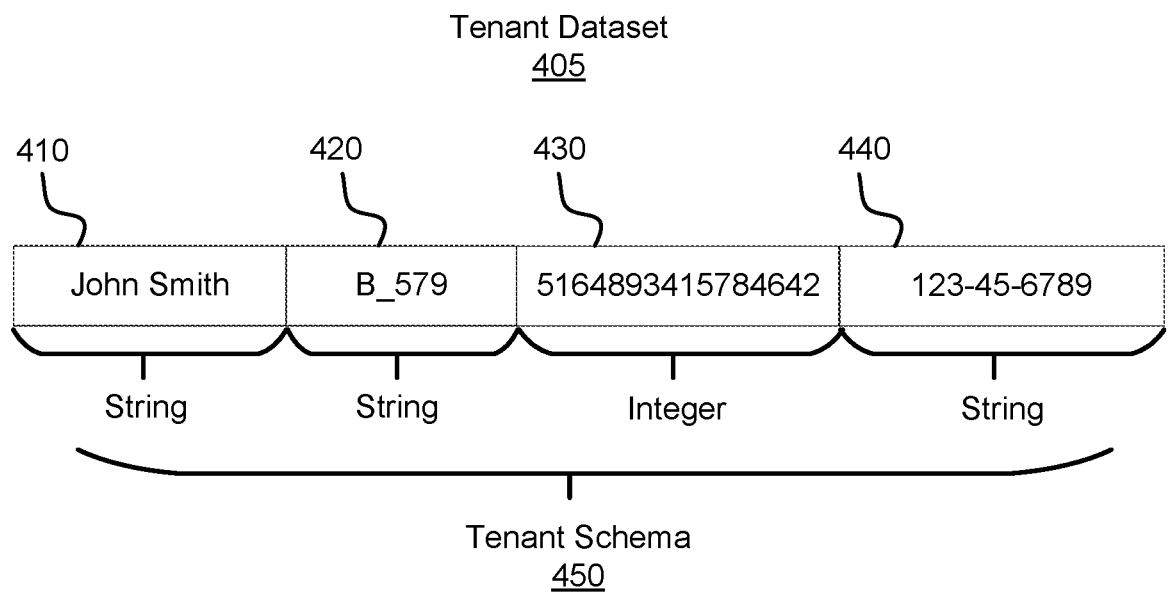
FIG. 4A is an example depiction of a dataset provided by a tenant, in accordance with an embodiment.

FIG. 4A is an example depiction of a tenant dataset 405 provided by a tenant 110, in accordance with an embodiment. Tenant dataset 405 can include entries 410, 420, 430, and 440, each entry including a data value. Although FIG. 4A depicts one row of entries 410, 420, 430, 440 of the tenant dataset 405, in other embodiments, the entries of the tenant dataset 405 can be differently arranged or there may be additional or fewer entries in the tenant dataset 405.

As shown in FIG. 4A, a tenant dataset 405 can include various data entries 410, 420, 430, 440, each entry including a data value. For example, each of entry 410, 420, 430, and 440 can include information such as a name (e.g., John Smith), a user identifier (e.g., B_579), a credit card number (e.g., 5164893415784642), and a social security number (e.g., 123-45-6789).

Generally, for each entry 410, 420, 430, and 440 in the tenant dataset 405, the data value in the entry has attributes that can be extracted. FIG. 4A depicts object type attributes for each entry 410, 420, 430, and 440 in the tenant dataset 405. Specifically, entry 410 may have a string type attribute, entry 420 may have a string type attribute, entry 430 may have an integer type attribute, and entry 440 may have a string type attribute. Although not explicitly shown in FIG. 4A, in various embodiments, the data value in each entry 410, 420, 430, and 440 can have additional attributes that can be a regular expression of the data value that is determined using a pattern recognition. For example, entry 410 can have an additional attribute that indicates that two words in the data value of entry 410 are separated by a space. As described above in relation to the dataset analysis module 210, the attributes of entries of the tenant dataset 405 as well as the order of the entries of the tenant dataset 405 define the tenant schema 450.

In various embodiments, the tenant schema 450 of the tenant dataset 405 is defined by the data value type in each entry 410, 420, 430, and 440 of the tenant dataset 405. For example, entry 410 includes a user name data value type, entry 420 includes a user identifier data value type, entry 430 includes a credit card number data value type, and entry 440 includes a social security number data value type. Each of the data value types of the entries 410, 420, 430, and 440 and the order of entries define the tenant schema 450.

Figure 4B:
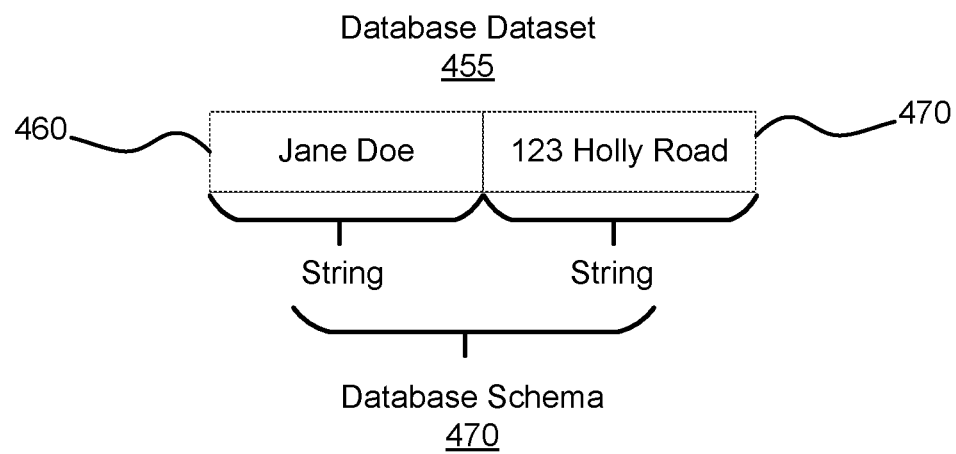
FIG. 4B is an example depiction of a database dataset with a database schema stored by the online database system, in accordance with an embodiment.

FIG. 4B an example depiction of a database dataset 455 with a database schema 470 stored by the online database system 150, in accordance with an embodiment. The database dataset 455 can include entries 460 and 470 that each includes a data value. Although FIG. 4B depicts one row of entries 460 and 470, in other embodiments, the entries of the database dataset 470 can be differently arranged or there may be additional or fewer entries in the database dataset 470.

The database dataset 455 stored by the online database system 150 can include data entries 460 and 470 that store information such as a name (e.g., Jane Doe) and address (123. Holly Road). The data values in each entry 460 and 470 have attributes. FIG. 4B illustrates that data values in each entry 460 and 470 have a string type attribute. Additionally, entry 460 can have additional attributes represented as a regular expression and determined through a pattern recognition. An additional attribute of entry 460 can be that two words in the data value of entry 460 are separated by a space. The attributes of entries 460 and 470 in the database dataset 455 and the order of the entries of the database dataset 455 define the database schema 470. In various embodiments, the database schema 470 of the database dataset 455 is defined by the data value type in each entry 460 and 470 of the database dataset 455. For example, entry 460 includes a user name data value type and entry 470 includes an address data value type. Each of the data value types of the entries 460 and 470 and the order of entries define the tenant schema 450.

In comparison to the tenant schema 450 shown in FIG. 4A, the database schema 470 shown in FIG. 4B is different.

For example, the database schema 470 includes fewer entries (e.g., entries 460 and 470) in comparison to the entries (e.g., entries 410, 420, 430, and 440) of the tenant schema 450. Therefore, the mapping that converts a tenant dataset 405 with a tenant schema 450 specifies the compression of one or more entries of the tenant dataset 405 (e.g., entries assigned the lowest predicted usage scores) to satisfy the database schema 470 of the database dataset 455.

Figure 5A:
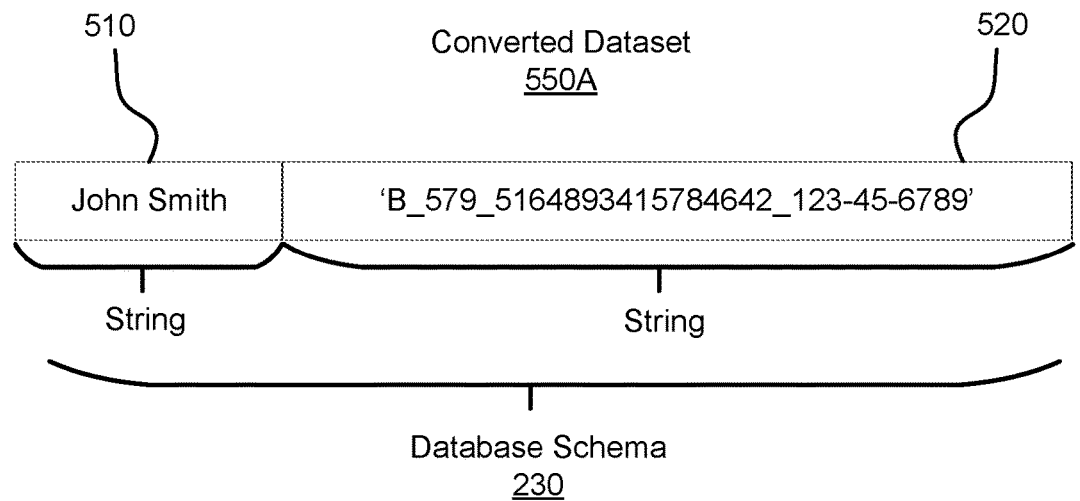
FIG. 5A depicts an example of a converted dataset that is generated by applying a mapping to the tenant dataset shown in FIG. 4A, in accordance with a first embodiment.

FIG. 5A depicts an example of a converted dataset 550A that is generated by applying a mapping to the tenant dataset 405 shown in FIG. 4A, in accordance with a first embodiment. The converted dataset 550A includes a first entry 510 and a second entry 520 with data values in each entry that now satisfy the database schema 230. As an example, each of the first entry 510 and second entry 520 include a data value that has a string type attribute. The string type attribute defines the schema of the converted dataset 550B, which, as shown in FIG. 5A, is the database schema 230.

Specifically, the first entry 510 can include a data value type of the user name (e.g., "John Smith"). Here, the user name is likely to be highly used by the online database system 150 and therefore, the mapping used to generate the converted dataset 550A can specify that an entry in the tenant dataset that includes the user name data value type is to be mapped to entry 510 in the converted dataset 550A. For example, the mapping may specify that entry 410 (see FIG. 4A) of the tenant dataset 405 is to be directly mapped to entry 510 of the converted dataset 550A.

The second entry 520 of the converted dataset 550A includes a data value that is compiled from the user identifier (e.g., "B_579"), credit card number (e.g., "5164893415784642") and social security number (e.g., "123-45-6789"). Here, the user identifier, credit card number, and social security number are less likely to be used by the online database system 150 in comparison to the user name data value type shown in entry 510. Therefore, the mapping used to generate the converted dataset 550A can specify that the entries of the tenant dataset are to be compressed into a single entry 520 in the converted dataset 550A.

Figure 5B:
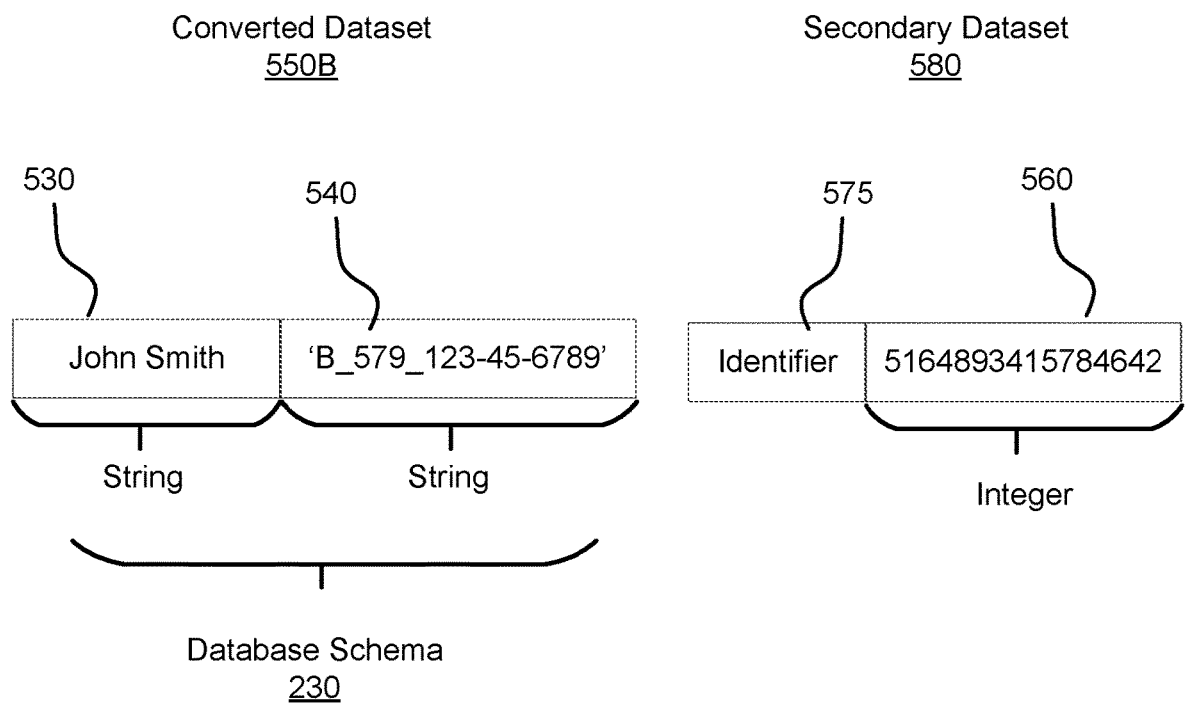
FIG. 5B depicts an example of a converted dataset that is generated by applying a mapping to the tenant dataset shown in FIG. 4A, in accordance with a second embodiment.

FIG. 5B depicts an example of a converted dataset 550B that is generated by applying a mapping to the tenant dataset 405 shown in FIG. 4A, in accordance with a second embodiment. The converted dataset 550B may include a subset of the data values included in the tenant dataset provided by the tenant 110. Additionally, data values not included in the converted dataset 550B can be included in a secondary dataset 580. The mapping specifies entries in the tenant dataset that are to be mapped to entries of the converted dataset 550B or to entries of the secondary dataset 580.

Converted dataset 550B includes a first entry 530 and a second entry 540 that each includes a data value such that the converted dataset 550B satisfies the database schema 230. As an example, each of the first entry 530 and second entry 540 include a data value that has a string type attribute. The string type attribute define the schema of the converted dataset 550B, which, as shown in FIG. 5B, is the database schema 230.

The first entry 530 of the converted dataset 550B can include a data value type of the user name (e.g., "John Smith"). The second entry 520 may include a subset of the data values that were originally in entries of the tenant dataset provided by the tenant 110. The second entry 520 shown in FIG. 5B includes the user identifier ("B_579") and the social security number ("123-45-6789"). Here, the user identifier and social security number may be less likely to be used in comparison to the user name (e.g., "John Smith") but may be more likely to be used in comparison to the credit card number ("5164893415784642").

Referring to the secondary dataset 580, it includes a tag 575 that identifies the secondary dataset 580 as a secondary dataset of the converted dataset 550B. The tag 575 may be an identifier of the converted dataset 550B, such as a row identifier, column identifier, or dataset identifier. Therefore, the secondary dataset 580 and the information stored therein can be accessed in relation to the converted dataset 550B when needed. For example, if the online database system 150 retrieves the converted dataset 550B, the identifier 575 of the secondary dataset 580 acts as a pointer so the secondary dataset 580 can also be retrieved when the converted dataset 550B is retrieved.

The secondary dataset 580 further includes an entry 560 that includes one or more data values from the tenant dataset that are not included in the converted dataset 550B. In various embodiments, the secondary dataset 580 include additional entries such that data values from the initial tenant dataset provided by the tenant 110 that are least likely to be used can each be stored individually within an entry of the secondary dataset 580. In accordance with the example shown in FIG. 5B, the credit card number originally included in a tenant dataset is least likely to be used. Here, the mapping used to generate the converted dataset 550B can specify that the entry of the tenant dataset that included the credit card number is to be separately included in entry 560 of the secondary dataset 580.

Figure 5C:
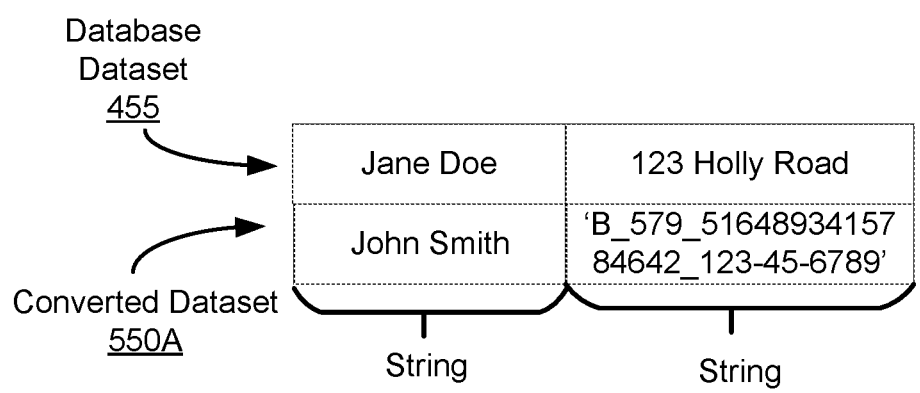
FIG. 5C depicts the incorporation of the converted dataset with datasets stored by the online database system, in accordance with the embodiment shown in FIG. 5A.

FIG. 5C depicts the incorporation of the converted dataset 550C with a database dataset 455 stored by the online database system 150, in accordance with the embodiment shown in FIG. 5A. Here, the converted dataset 550A and the database dataset 455 each have two entries that include data values with attributes that satisfy the database schema 230 of the online database system 150. For example, each of the converted dataset 550A and the database dataset 455 includes two entries that each have a data value that has a string type attribute. In various embodiments, the converted dataset 550A can be stored in conjunction with the database dataset 455. FIG. 5C depicts an example where the converted dataset 550A is appended as an additional row below the database dataset 455. In other embodiments, the converted dataset 550A can be differently incorporated (e.g., incorporated as an additional column or a combination of an additional column and row). In other embodiments, the database dataset 455 and the converted dataset 550A need not be combined and can be separately stored.

For subsequent processes that require datasets of the online database system 150, the online database system 150 can appropriately interpret data values included in both the database dataset 455 and the converted dataset 550A that originated from the tenant 110. As an example, if a search is to be performed across all datasets, the online database system 150 can search across stored database datasets 455 and converted datasets 550A to obtain the most comprehensive search result.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by an online system from a tenant, a tenant dataset comprising a plurality of entries;
   extracting attributes of the entries of the tenant dataset;
   determining a tenant schema of the tenant dataset based on the extracted attributes for each of the entries;
   comparing the tenant schema of the tenant dataset to a database schema used by the online system;
   generating a mapping based on the comparison between the tenant schema of the tenant dataset and the database schema, the mapping describing how to convert the tenant dataset into a converted dataset that satisfies the database schema, wherein generating the mapping includes:
   assigning a predicted usage score for each entry in the plurality of entries, the predicted usage score representing a likelihood that the online system will access a data value stored in the entry;
   determining, based on the assigned predicted usage scores, a subset of the plurality of entries of the tenant dataset to be concatenated into a single data value; and
   generating a format for concatenating the subset of the plurality of entries of the tenant data set such that the subset of the plurality of entries can be stored as a single data value within a single entry of the database schema; and
   storing the determined mapping.

2. The method of claim 1, further comprising:
   converting the tenant dataset into the converted dataset using the mapping; and
   storing the converted dataset at the online system.

3. The method of claim 1, further comprising:
   receiving, by the online system, an additional tenant dataset from the tenant;
   performing a check on the additional tenant dataset, wherein performing the check comprises:
   determining a tenant schema of the additional tenant dataset; and
   determining whether the tenant schema of the additional tenant dataset aligns with the tenant schema of the received tenant dataset.

4. The method of claim 3, further comprising:
   responsive to determining that the tenant schema of the additional tenant dataset does not align with the tenant schema of the tenant dataset, triggering a generation of a new mapping for the tenant.

5. The method of claim 1, wherein the subset of the plurality of entries of the tenant dataset to be concatenated into a single data value comprises entries from the plurality of entries that were assigned the lowest predicted usage scores.

6. The method of claim 1, wherein determining a schema of the received tenant dataset based on the extracted attributes for each of the entries comprises:
   determining a data value type for an entry by accessing a stored relationship between the extracted attributes of the entry and the data value type; and
   determining the schema of the tenant dataset based on at least the determined data value type for the entry.

7. A non-transitory computer readable storage medium comprising steps that, when executed by a processor, causes the processor to:
   receive, by an online system from a tenant, a tenant dataset comprising a plurality of entries;
   extract attributes of the entries of the tenant dataset;
   determine a tenant schema of the tenant dataset based on the extracted attributes for each of the entries;
   compare the tenant schema of the tenant dataset to a database schema used by the online system;
   generate a mapping based on the comparison between the tenant schema of the tenant dataset and the database schema, the mapping describing how to convert the tenant dataset into a converted dataset that satisfies the database schema, wherein the steps that cause the processor to generate a mapping includes steps that, when executed further cause the processor to:
   assign a predicted usage score for each entry in the plurality of entries, the predicted usage score representing a likelihood that the online system will access a data value stored in the entry;

determine, based on the assigned predicted usage scores, a subset of the plurality of entries of the tenant dataset to be concatenated into a single data value; and generate a format for concatenating the subset of the plurality of entries of the tenant data set such that the subset of the plurality of entries can be stored as a single data value within a single entry of the database schema; and store the determined mapping.

8. The computer-readable storage medium of claim 7, further comprising steps that, when executed by the processor, cause the processor to:

convert the tenant dataset into the converted dataset using the mapping; and store the converted dataset at the online system.

9. The computer-readable storage medium of claim 7, further comprising steps that, when executed by the processor, cause the processor to:

receive, by the online system, an additional tenant dataset from the tenant;

perform a check on the additional tenant dataset, wherein the steps that cause the processor to perform the check further comprises steps that, when executed, cause the processor to:

determine a tenant schema of the additional tenant dataset; and determine whether the tenant schema of the additional tenant dataset aligns with the tenant schema of the received tenant dataset.

10. The computer-readable storage medium of claim 9, further comprising steps that, when executed by the processor, cause the processor to:

responsive to the determination that the tenant schema of the additional tenant dataset does not align with the tenant schema of the tenant dataset, trigger a generation of a new mapping for the tenant.

11. The computer-readable storage medium of claim 7, wherein the subset of the plurality of entries of the tenant dataset to be concatenated into a single data value comprises entries from the plurality of entries that were assigned the lowest predicted usage scores.

12. The computer-readable storage medium of claim 7, wherein the steps that cause the processor to determine a schema of the tenant dataset based on the extracted attributes for each of the entries include steps that cause the processor to:

determine a data value type for an entry by accessing a stored relationship between the extracted attributes of the entry and the data value type; and determine the schema of the tenant dataset based on at least the determined data value type for the entry.

13. A method comprising:

receiving a tenant dataset comprising a plurality of entries;

extracting attributes of the entries of the tenant dataset;

determining a tenant schema of the tenant dataset based on the extracted attributes for each of the entries;

generating a mapping between the tenant schema of the tenant dataset and a database schema used by an online system, the mapping describing how to convert the tenant dataset into a converted dataset that satisfies the database schema, wherein the generating the mapping includes:

assigning a predicted usage score for each entry in the plurality of entries, the predicted usage score representing a likelihood that the online system will access a data value stored in the entry;

determining, based on the assigned predicted usage scores, a subset of the plurality of entries of the tenant dataset to be concatenated into a single data value; and generating a format for concatenating the subset of the plurality of entries of the tenant data set such that the subset of the plurality of entries can be stored as a single data value within a single entry of the database schema; and storing the determined mapping.

14. The method of claim 13, further comprising:

converting the tenant dataset into the converted dataset using the mapping; and storing the converted dataset at the online system.

15. The method of claim 13, further comprising:

receiving, by the online system, an additional tenant dataset from the tenant;

performing a check on the additional tenant dataset, wherein performing the check comprises:

determining a tenant schema of the additional tenant dataset; and determining whether the tenant schema of the additional tenant dataset aligns with the tenant schema of the received tenant dataset.

16. The method of claim 15, further comprising:

responsive to determining that the tenant schema of the additional tenant dataset does not align with the tenant schema of the tenant dataset, triggering a generation of a new mapping for the tenant.

17. The method of claim 13, wherein the subset of the plurality of entries of the tenant dataset to be concatenated into a single data value comprises entries from the plurality of entries that were assigned the lowest predicted usage scores.

* * * * *